(No Model.)
O. D. THOMPSON.
VEHICLE SEAT LOCK.
No. 457,328.　　　　　　　　　　Patented Aug. 4, 1891.
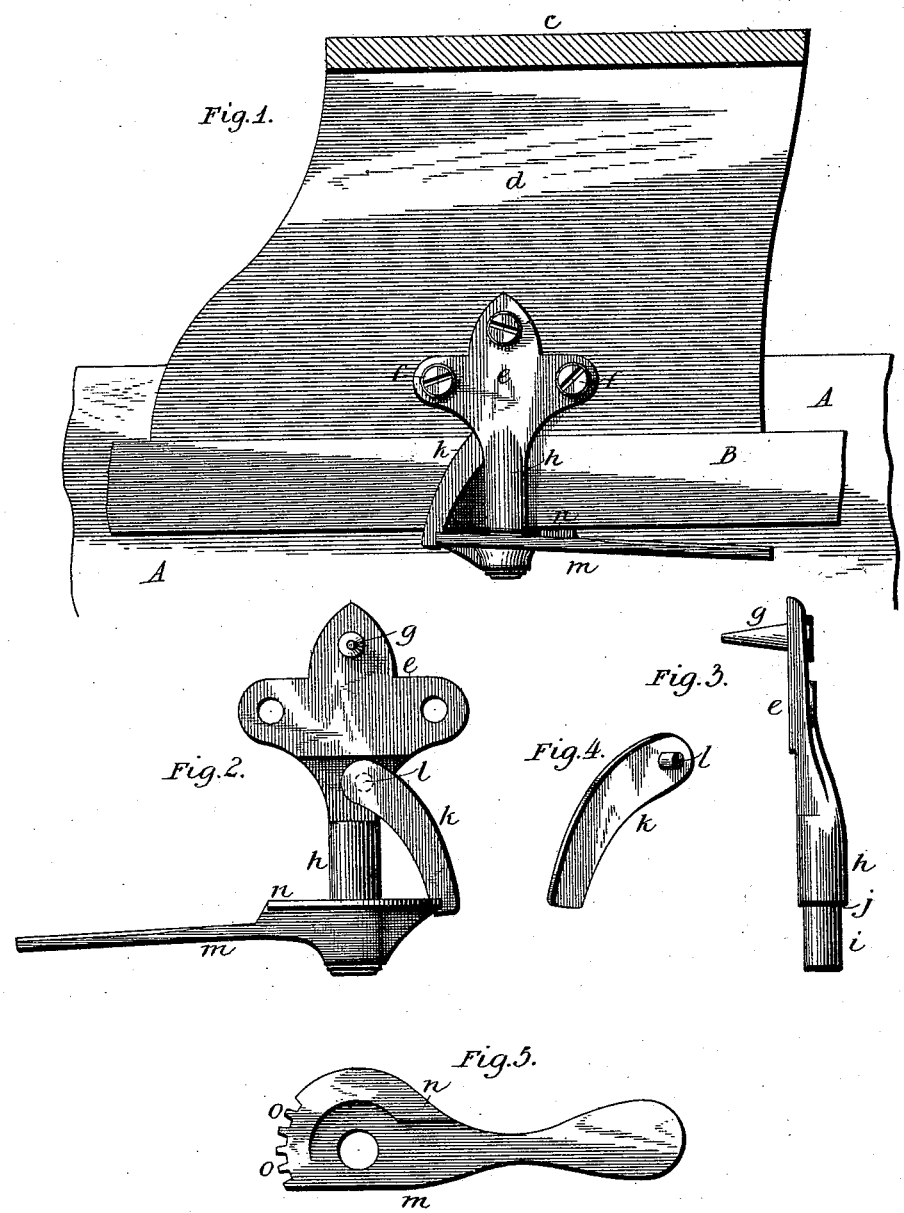
Witnesses:
Will. Norton
Zamich Duvall
Inventor:
Otis D. Thompson
by F. W. Browne, Attorney.

UNITED STATES PATENT OFFICE.

OTIS D. THOMPSON, OF ELKHART, INDIANA.

VEHICLE SEAT-LOCK.

SPECIFICATION forming part of Letters Patent No. 457,328, dated August 4, 1891.

Application filed November 14, 1890. Serial No. 371,453. (No model.)

*To all whom it may concern:*

Be it known that I, OTIS D. THOMPSON, a citizen of the United States, residing at Elkhart, in the county of Elkhart and State of Indiana, have invented certain new and useful Improvements in Vehicle Seat-Locks; and I do hereby declare the following to be a full, clear, and exact description of the invention, such as will enable others skilled in the art to which it appertains to make and use the same.

My invention relates to seat-locks for carriages and wagons, and has for its object to provide a device that shall secure the seat at any desired position along the length of the body of the vehicle, and that shall effectually resist all tendency to loosening and the consequent unlocking of the parts due to jarring and kindred causes.

To these ends my invention consists in a seat-lock of new and novel construction and operation, all of which will fully appear from the following description and claims, taken in connection with the accompanying drawings, in which—

Figure 1 shows a portion of a vehicle-body and its seat with my invention applied thereto, the parts being in the position they assume when locked; Fig. 2, a rear view, enlarged, of the locking device. Figs. 3, 4, and 5 are details, enlarged, of the several parts constituting my invention.

A represents the body of a vehicle, and B the rail secured thereto, these parts being of the ordinary and well-known construction.

$c$ is the seat, the risers $d$ of which rest on and are supported by the rail.

$e$ represents one of two plates secured to the risers and on the inside thereof by means of screws $ff$ and by the stud or projection $g$ on the plate entering a hole made therefor in the riser. The lower portion of the plate terminates in a shank $h$, which has the reduced portion $i$ at its extremity, forming a shoulder $j$.

$k$ is an arm pivoted to the plate, as shown, by means of a stud $l$ entering a socket in the inner face of the plate $e$.

$m$ is a lever loosely pivoted on the reduced portion $i$. The inner end of the lever is formed with a plate substantially semicircular in shape, and is provided with a cam $n$, which when the lever is swung under the rail abuts against the under side thereof and binds the rider to the rail.

$o\ o$ are a series of recesses, which when the parts are in their locked position engage the arm $k$ and prevent the lever from being accidentally moved.

When it is desired to apply these locks to a seat having inclined risers, the plates $e$ and their shanks are bent to conform to the shape required.

By my invention I am enabled to make a lock simple in construction and operation, and which when locked cannot accidentally become loosened. My invention also permits the seat to be secured to the body at any position along the length thereof.

I claim—

1. In a seat-lock for vehicles, the combination, with the body and its seat, of a lever pivotally connected to the seat and having its inner end terminating in a cam-shaped plate having serrations on its outer edge, and a pawl for engagement with such serrations, all substantially as and for the purposes set forth.

2. In a seat-lock for vehicles, the combination, with the body and its seat, of a post connected to the riser and having a pawl pivotally secured thereon, and a cam-shaped plate pivoted on the lower end of the post and having a handle thereon, and also having serrations for engagement with said pawl, all substantially as and for the purpose set forth.

In testimony whereof I affix my signature in presence of two witnesses.

OTIS D. THOMPSON.

Witnesses:
 JOHN J. NEUMAN,
 DELOS N. WEAVER.